United States Patent
Lee et al.

(10) Patent No.: US 7,102,972 B2
(45) Date of Patent: Sep. 5, 2006

(54) METHOD OF RECORDING DRIVE INFORMATION ON OPTICAL DISC AND OPTICAL DISC HAVING DRIVE INFORMATION RECORDED USING THE METHOD

(75) Inventors: Kyung-geun Lee, Gyeonggi-do (KR); Jung-wan Ko, Gyeonggi-do (KR); In-sik Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 10/441,264

(22) Filed: May 20, 2003

(65) Prior Publication Data

US 2004/0017753 A1    Jan. 29, 2004

(30) Foreign Application Priority Data

May 20, 2002   (KR)   ................................. 2002-27952
May 20, 2002   (KR)   ................................. 2002-27953

(51) Int. Cl.
*G11B 7/007*   (2006.01)

(52) U.S. Cl. ................. 369/53.17; 369/30.25; 369/275.3

(58) Field of Classification Search ............ 369/53.17, 369/53.21, 47.13, 47.14, 53.24, 275.3, 30.04, 369/53.36, 47.49, 30.25; 709/247; 386/98, 386/125, 126
See application file for complete search history.

(56) References Cited

U.S. PATENT DOCUMENTS

| 5,448,433 | A |   | 9/1995 | Morehouse et al. |
| 5,596,565 | A | * | 1/1997 | Yonemitsu et al. ...... 369/275.3 |
| 5,623,470 | A | * | 4/1997 | Asthana et al. .......... 369/47.49 |
| 5,805,539 | A | * | 9/1998 | Igarashi et al. .......... 369/47.13 |
| 5,805,547 | A | * | 9/1998 | Yamamuro ................ 369/53.21 |
| 6,134,214 | A | * | 10/2000 | Takagi et al. ............. 369/47.14 |
| 6,198,877 | B1 | * | 3/2001 | Kawamura et al. ........... 386/98 |
| 6,341,109 | B1 | * | 1/2002 | Kayanuma ............... 369/47.14 |
| 6,370,090 | B1 | * | 4/2002 | Verbakel et al. ......... 369/30.04 |
| 6,515,212 | B1 | * | 2/2003 | Taira et al. ................. 709/247 |

FOREIGN PATENT DOCUMENTS

JP    3-59846    3/1991

* cited by examiner

*Primary Examiner*—Thang V. Tran
*Assistant Examiner*—Kim-Kwok Chu
(74) *Attorney, Agent, or Firm*—Stein, McEwen & Bui, LLP

(57) ABSTRACT

A method of recording drive information on an optical disc and an optical disc having drive information recorded using the method. The method of recording drive information comprises including a plurality of physical clusters in a drive region where disc drive information is recorded, recording the drive information in a set of a plurality of consecutive and available physical clusters, and recording an address of a reliable physical cluster, which is the first physical cluster of the plurality of consecutive and available physical clusters, in a separate region other than the drive region.

21 Claims, 5 Drawing Sheets

FIG. 1
(Prior Art)

| | DESCRIPTION | PURPOSE |
|---|---|---|
| LEAD-IN AREA | | |
| READ-ONLY AREA | PIT OR HIGH FREQUENCY WOBBLE | DISC-RELATED CONTROL DATA |
| REWRITABLE AREA | DMA | DEFECT MANAGING |
| | CONTROL DATA | DATA INFORMATION |
| | OPC TESTING ZONE | OPC TESTING |
| | DRIVE REGION | DRIVE RELATED INFORMATION |
| | BUFFER | BUFFER FOR DATA REGION |

100 — (LEAD-IN AREA / READ-ONLY AREA)
110 — (REWRITABLE AREA)

| BITE POSITION IN DATA FRAME | DESCRIPTION |
|---|---|
| ... | ... |
| m | ADDRESS OF RELIABLE PHYSICAL CLUSTER WHICH IS THE FIRST FROM THE BEGINNING OF DRIVE REGION |
| m+1 | |
| ... | ... |

FIG. 6

| BITE POSITION IN DATA FRAME | DESCRIPTION |
|---|---|
| ... | ... |
| m | ADDRESS OF PHYSICAL CLUSTER WHERE VALID DRIVE INFORMATION IS RECORDED — 21 |
| m+1 | ADDRESS OF PHYSICAL CLUSTER WHERE COPY OF THE DRIVE INFORMATION IS RECORDED — 22 |
| ... | ... |

METHOD OF RECORDING DRIVE INFORMATION ON OPTICAL DISC AND OPTICAL DISC HAVING DRIVE INFORMATION RECORDED USING THE METHOD

CROSS-REFERENCE TO RELATED APPLICATIONS

This application claims the priority of Korean Patent Application Nos. 2002-27952 and 2002-27953, filed on May 20, 2002, in the Korean Intellectual Property Office, the disclosure of which is incorporated herein in its entirety by reference.

BACKGROUND OF THE INVENTION

1. Field of the Invention

The present invention relates to a method of recording drive information on an optical disc and an optical disc on which drive information is recorded using the method.

2. Description of the Related Art

In a 4.7 GB DVD-RAM, which allows data to be recorded thereon or removed therefrom, drive information, which is used after the optical disc is inserted into a drive, e.g., information on a drive manufacturing company or a serial number, is recorded in a disc identification zone of a lead-in zone where data can be rewritten. However, since only two error correction codes (ECC) are assigned to the disc identification zone, drive information cannot be recorded in the disc identification zone if the two ECCs have defects and cannot be used.

Accordingly, an HD-DVD, which has a capacity of over 23 GB and on which data can be rerecorded, is required to have a drive zone having more than two physical clusters in the lead-in zone wherein drive information must be recorded. FIG. 1 shows one embodiment of a physical structure of the lead-in zone, which has a diameter longer than a predetermined diameter from the center hole of the disc. The lead-in zone includes a read-only zone 100 in which data is pre-recorded and a rewritable zone 110 in which data can be rerecorded. The read only region 100 includes control data which is related to the disc.

The rewritable zone 110 includes a test zone, a defect management area (DMA) for removing and managing defects occurring in the disc, a control data zone, an optimum power control (OPC) test zone, and a buffer area.

Here, the rewritable zone 110 further includes a drive region where the drive information is recorded. The drive region is comprised of a plurality of physical clusters, each cluster comprising a plurality of data frames. In the drive region, information on the manufacturing company, a serial number, or the like are recorded. The above described method is typically required as the method of recording information in the drive region which is composed of a plurality of physical clusters.

SUMMARY OF THE INVENTION

An aspect of the present invention provides a method of recording information in a drive region comprising a plurality of clusters, by recording drive information in a set of consecutive and reliable physical clusters in the drive region, and recording an address of the first reliable cluster in a disc definition structure DDS (Disc Definition Structure), thereby effectively recording drive information, and an optical disc in which drive information is recorded using the method.

It is another aspect of the present invention to provide a method of recording drive information by sequentially using consecutive and reliable physical clusters from the first cluster in a drive region where the drive information is recorded, and recording all addresses of the clusters in the DDS, thereby effectively recording the drive information, and an optical disc in which drive information is recorded by using the method.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the invention will become more apparent by describing, in detail, preferred embodiments thereof with reference to the attached drawings in which:

FIG. 1 shows a structure of a conventional lead-in area;

FIG. 6 is a view of a part of a DDS in which drive information is recorded according to the method of recording drive information of the second embodiment of the present invention.

DETAILED DESCRIPTION OF THE PREFERRED EMBODIMENTS

Figures 2, 3:
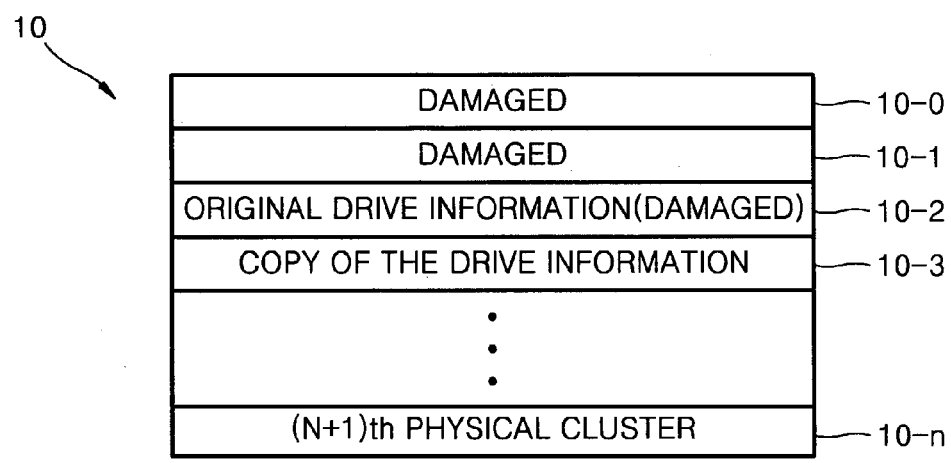
FIG. 2 is a view showing a drive region in a method of recording drive information according to a first embodiment of the present invention.
FIG. 3 is a view showing a DDS (Disc Definition Structure) in the method of recording drive information of the first embodiment of the present invention.

The present invention will now be described more fully with reference to the accompanying drawings, in which preferred embodiments of the invention are shown. Like reference numerals refer to like elements throughout the specification and the drawings.

According to a method of recording drive information of the present invention, drive information is recorded consecutively or sequentially from the beginning of reliable clusters when an unreliable physical cluster is present due to consecutive or non-consecutive defects in some physical clusters of a drive region in which the drive information is recorded.

According to a first embodiment of the present invention, drive information is recorded in a set of a reliable and consecutive plurality of clusters of the drive region. That is, the drive information is recorded in a set of the reliable and consecutive plurality of clusters except for any physical cluster which is damaged, defective, or unreliable, starting from the beginning of the drive region.

Referring to FIG. 2, a drive region 10, in which the drive information is recorded, includes n+1 numbers of physical clusters, 10-0, 10-1, 10-2, . . . , 10-n. If, for example, the zero physical cluster 10-0 and the first physical cluster 10-1 are damaged, and the second cluster 10-2 and the third cluster 10-3 are reliable, original drive information and a copy of the drive information are respectively recorded in the set of the second physical cluster 10-2 and the third physical cluster 10-3. Thus, the drive information is recorded in the consecutive physical clusters among available physical clusters. In one implementation, the drive information may be recorded in a set of two available physical clusters.

The drive region 10 can be included in other regions, but not in a user data area. Referring to FIG. 1, the lead-in area of the inner circumference of the disc track includes a read only region 100 and a rewritable region 110. The drive region 10 may be included in a predetermined area of the rewritable region 110, or in a predetermined area of a rewritable region (not shown) of a lead-out region of the outer circumference of the disc track. Although not shown in the figures, the lead-out area can also include the drive region, and the drive information can be recorded in a set of a plurality of consecutive available physical clusters of such drive region.

According to the method of recording the drive information of the present embodiment, the addresses of a set of physical clusters, in which the original drive information and the copy of the drive information are recorded, are recorded and managed in a separate region other than the drive region. For example, the address of the first reliable physical cluster of a set of physical clusters, in which the drive information is recorded, is recorded in the region where information related to defect managing is recorded. The region where information related to defect managing may be a defect managing area DMA as shown in FIG. 1.

FIG. 3 shows a disc definition structure DDS of the DMA. The address of the first reliable physical cluster of a set of physical clusters, in which the drive information is recorded, is recorded in a predetermined area of the DDS of the DMA. For example, the address may be recorded in an m-bit s position 12 of a data frame. Here, the reliable physical cluster denotes a physical cluster that has undamaged and complete information and thus data can be smoothly reproduced and recorded. The address of the physical cluster can be recorded as a physical sector number PSN corresponding to each physical cluster.

For example, if both the physical cluster in which the original drive information is recorded and the physical cluster in which the copy of the drive information is recorded are reliable, the address of the physical cluster containing the original drive information is recorded. However, if the physical cluster where the original drive information is recorded is damaged and unreliable, and the physical cluster where the copy of the drive information is recorded is reliable, the address of the physical cluster containing the copy of the drive information is recorded in the DDS.

In addition, if the physical cluster containing the original drive information becomes damaged or defective during a use thereof, and thus becomes unreliable, the address of the physical cluster containing the copy of the drive information is newly recorded in the DDS.

If the second physical cluster 10-2 and the third physical cluster 10-3 become damaged and unreliable, the original drive information and the copy of the drive information are recorded again in the next available physical clusters such as a fourth physical cluster and a fifth physical cluster. Then, if the fourth physical cluster is reliable, the address of the fourth physical cluster is recorded in the DDS. If the fifth physical cluster is reliable and the fourth physical cluster becomes unreliable, the address of the fifth physical cluster is newly recorded in the DDS.

As described above, the address of the first reliable physical cluster is recorded in the DDS and is continually updated as an address of the first reliable physical cluster. Thus, the drive information which is reliable can be immediately reproduced without any delay.

An optical disc according to an embodiment of the present invention includes a drive region, in which the drive information is recorded, and the original drive information and the copied drive information are recorded in a set of consecutive available physical clusters.

The address of the first reliable physical cluster of the physical clusters where the original drive information and the copy of the drive information are respectively recorded can be recorded in a separate region other than the drive region. For example, the address may be recorded in the region where the information related to defect managing is recorded.

Here, the address of the first reliable physical cluster of the drive region denotes the address of the first reliable physical cluster from the beginning of the drive region. Therefore, if the first physical cluster from the beginning of a set of physical clusters is reliable among the two physical clusters where the drive information is recorded, the address of the first physical cluster from the front of a set of two physical clusters is recorded. If the second physical cluster from the front of a set of two physical clusters is reliable, the address of the second physical cluster is recorded.

The method according to the first embodiment of the present invention is advantageous in that the drive information can be rapidly and correctly reproduced by recording the address of the first physical cluster from the beginning of a set of physical clusters where the drive information is recorded.

Next, a method of recording the drive information according to a second embodiment will be described.

In this case, the drive information is sequentially recorded in the reliable physical clusters if defects occur in consecutive or non-consecutive physical clusters and the defective physical clusters are unreliable.

Here, the drive information can be sequentially recorded in a set of physical clusters as well as in each physical cluster.

Figure 4:
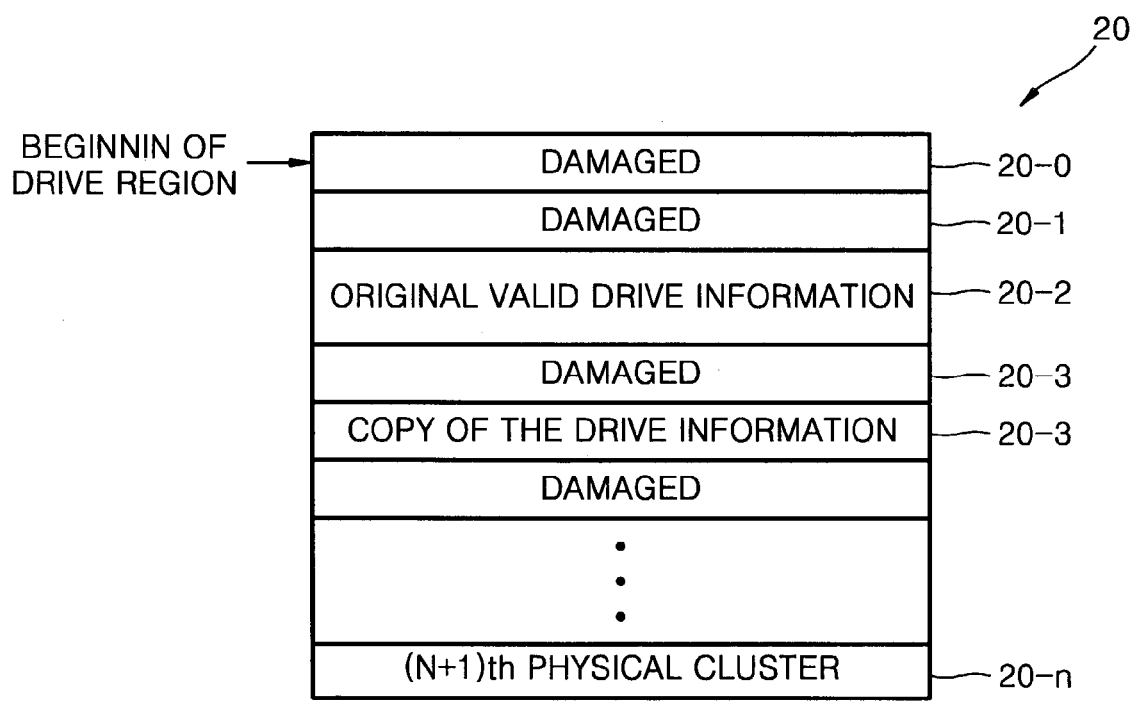
FIG. 4 shows a structure of a drive region in a method of recording drive information according to a second embodiment of the present invention.

Referring to FIG. 4, a drive region 20, in which the drive information is recorded, includes a plurality of physical clusters. According to the second embodiment of the present invention, the same drive information is recorded in at least two physical clusters so as to provide against a case where the drive information is not available due to a defect or damage to one of the physical clusters. Here, for convenience, the drive information is deemed to be recorded in two physical clusters.

For example, if a zero physical cluster 20-0 and a first physical cluster 20-1 are damaged, a second physical cluster 20-2 is reliable, a third physical cluster 20-3 is damaged and a fourth physical cluster 20-4 is reliable, the original valid drive information and the copy of the drive information are recorded in the second physical cluster 20-2 and the fourth physical cluster 20-4.

Figure 5:
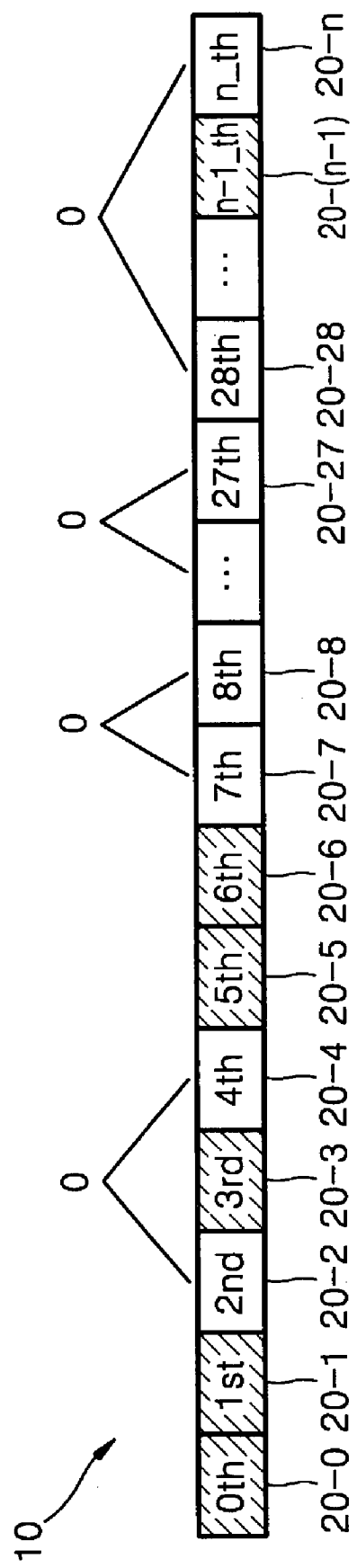
FIG. 5 is a view of a drive region in a method of recording drive information of the second embodiment of the present invention.

As described above, the drive information is recorded sequentially and selectively in the reliable physical clusters of the drive region. Preferably, the drive information may be recorded in a set of two physical clusters. FIG. 5 shows the drive region of n physical clusters where the damaged and unreliable regions are presented by hatching. As shown in FIG. 5, if the zero physical cluster 20-0 and the first physical cluster 20-1 are damaged and not available, the second physical cluster 20-2 is reliable, and the third physical cluster 20-3 is not available, the valid drive information of the original drive information and the copy of the drive information are recorded sequentially in the first reliable and available physical clusters.

That is, the valid drive information of the original drive information and the copy of the drive information are recorded in the second physical cluster 20-2 and the fourth physical cluster 20-4, respectively. In FIG. 5, a fifth physical cluster 20-5 and a sixth physical cluster 20-6 are unreliable and not available, and the drive information is recorded in a set of the seventh physical cluster 20-7 and the eighth physical cluster 20-8 if clusters 20-2 and 20-4 are not available. In FIG. 5, the set of two physical clusters where the drive information is recorded is sequentially indicated by "0".

The drive region 20 can be included in other regions, but not in a user data area. Referring to FIG. 1, the lead-in area of the inner circumference of the disc track includes a read only region 100 and a rewritable region 110. The drive region 20 may be included in a predetermined area of the rewritable region 110, or in a predetermined area of a rewritable region (not shown) of a lead-out region of the outer circumference of the disc track. Although not shown in the figures, the lead-out area can also include the drive region, and the drive information can be recorded in a set of consecutive available physical clusters of the drive region.

According to the method of recording drive information of the present invention, the addresses of a set of physical clusters, in which the valid drive information and the copy of the drive information are recorded, are recorded and managed in a separate region other than the drive region. For example, the address of the first reliable physical cluster of a set of physical clusters, in which the drive information is recorded, is recorded in the region where information related to defect managing is recorded. The region where information related to defect managing may be a defect managing area DMA of FIG. 1.

FIG. 6 shows the DDS of the DMA. An address 21 of the physical cluster in which the original valid drive information is recorded and an address 22 of the physical cluster in which the copy of the drive information is recorded, are recorded in a predetermined area of the DDS of the DMA. For example, the addresses can be recorded in an m-bit s and an (m+1)-bit s position. Here, the address can be recorded as a physical sector number PSN corresponding to each physical cluster. As described above, since both the addresses 21 and 22 are recorded, at least one drive information can be used in recording and/or reproducing data. That is, when the data is recorded and/or reproduced, the drive information in the region can be accessed by having the address of the region having the reliable drive information recorded in the DDS.

According to the second embodiment of the present invention, the drive information is recorded sequentially in the first set of the reliable and available physical clusters, the addresses of the physical clusters containing the drive information are recorded in the DDS, and the drive information can be recorded in at least one physical cluster of the set of reliable physical clusters.

While this invention has been particularly shown and described with reference to embodiments thereof, it will be understood by those skilled in the art that various changes in form and details may be made therein without departing from the spirit and scope of the invention as defined by the appended claims and equivalents thereof.

What is claimed is:

1. A method of recording drive information, comprising:
providing, in a drive region on an information storage medium, a plurality of physical clusters where drive information is recorded;
recording the drive information in a set of consecutive and available physical clusters of the plurality of physical clusters; and
recording an address of a first reliable physical cluster from the set of the consecutive and available physical clusters, in a separate region other than the drive region on the information storage medium,
wherein the recording the address of the first reliable physical cluster comprises recording the address of the first reliable physical cluster from the set of consecutive and available physical clusters in a region where information related to defect management is recorded on the information storage medium.

2. The method of claim 1, wherein the drive region is included in a region other than a user data area such that the plurality of physical clusters in the drive region are located in other than the user data area.

3. The method of claim 2, further comprising a lead-in area that includes a rewritable region and a read only region such that the plurality of physical clusters are located in the rewritable region of the lead-in area.

4. A method of recording drive information on a disc having a drive region, comprising:
including, in the drive region on the disc, a plurality of physical clusters; and
recording the drive information sequentially from the beginning of a first reliable and available physical cluster of the plurality of physical clusters,
wherein the recording the drive information comprises:
recording the drive information in a set of consecutive and available physical clusters of the plurality of physical clusters in the drive region;
recording a valid original of the drive information and a copy of the drive information in two reliable physical clusters from the set of consecutive and available physical clusters, respectively, in the drive region; and
recording the addresses of the two reliable physical clusters where the drive information is recorded in the separate region where information related to defect management is recorded on the disc.

5. A method of recording drive information on a disc having a drive region, comprising:
including, in the drive region on the disc, a plurality of physical clusters; and
recording the drive information sequentially from the beginning of a first reliable and available physical cluster of the plurality of physical clusters,
wherein the recording the drive information comprises recording the address of the first reliable and available physical cluster where the drive information is recorded in a region where information related to defect management is recorded on the disc.

6. An optical disc comprising:
a data area to record user data; and
a drive region different from the data area, to record drive information in a set of consecutive and available physical clusters of a plurality of the physical clusters; and
a separate region other than the drive region, to record an address of a first reliable physical cluster from the consecutive and available physical clusters,
wherein the separate region corresponds to a defect management area (DMA) configured to record a defect occurring in the data area, and addresses of the consecutive and available physical clusters are recorded therein.

7. An optical disc, comprising:
a data area disposed between a lead-in area and a lead-out area, for recording data; and
a drive region having a plurality of physical clusters, located in one of the lead-in area and the lead-out area, for recording drive information in the plurality of physical clusters,
wherein the drive information is recorded sequentially beginning with a first reliable and available physical cluster of the plurality of physical clusters;
wherein a valid original of the drive information and a copy of the drive information are recorded sequentially in two reliable and available physical clusters of the plurality of physical clusters, respectively, in the drive region; and
wherein the addresses of the two reliable and available physical clusters, where the drive information is recorded, are recorded in the separate region where information related to defect management is recorded in the lead-in area.

8. A method of recording drive information on a disc having physical cluster, comprising:
identifying reliable physical clusters of the physical clusters; and
recording an original of the drive information on a first physical cluster of the reliable physical clusters and a copy of the drive information on a next available second physical cluster of the reliable physical clusters, wherein the disc comprises:
a data area to record user data;
a defect management area (DMA) to record a defect occurring in the data area; and
a drive region to record both the original and the copy of the drive information in the reliable physical clusters.

9. The method of claim 8, further comprising:
recording an address of the first physical cluster in the defect management area (DMA) where the original of the drive information is recorded; and
recording an address of the next available second physical cluster in the defect management area (DMA) where the copy of the drive information is recorded.

10. The method of claim 9, wherein the drive region is located in one of a lead-in area and a lead-out area for recording control information pertaining to the disc.

11. The method of claim 9, wherein the drive region is included in a rewriteable portion of one of a lead-in area and a lead-out area for recording control information pertaining to the disc.

12. The method of claim 9, wherein the disc comprises a user data area that does not include the disc definition structure such that the recording comprises recording the address of the first physical cluster in the disc definition structure which is not located in the user data area.

13. The method of claim 8, further comprising:
recording an address of the first physical cluster in the defect management area (DMA) where the original of the drive information is recorded; and
periodically verifying that the reliable physical clusters continue to be reliable.

14. The method of claim 13, wherein if the first physical cluster becomes defective or unreliable, then
relocating the original of the drive information from the first physical cluster to a reliable third physical cluster; and
recording an address of the third physical cluster in the defect management area (DMA).

15. The method of claim 14, wherein the address of the third physical cluster is recorded over the address of the first physical cluster in the defect management area (DMA).

16. The method of claim 13, wherein if the first physical cluster becomes defective or unreliable, then
recording an address of the second physical cluster in the defect management area (DMA).

17. The method of claim 16, wherein the address of the second physical cluster is recorded over the address of the first physical cluster in the defect management area (DMA).

18. The method of claim 8, further comprising:
accessing the original of the drive information or the copy of the drive information.

19. A method of recording drive information on a disc having physical clusters, comprising:
identifying reliable physical clusters of the physical clusters;
recording an original of the drive information on a first physical cluster of the reliable physical clusters and a copy of the drive information on a next available second physical cluster of the reliable physical clusters; and
periodically verifying that the reliable physical clusters continue to be reliable, wherein if the first physical cluster and the second physical cluster become defective or unreliable, then further comprising:
relocating the original of the drive information from the first physical cluster to a reliable third physical cluster; and
relocating the copy of the drive information from the second physical cluster to a reliable fourth physical cluster.

20. The method of claim 19, wherein if the third physical cluster or the fourth physical cluster become defective or unreliable, then further comprising:
relocating the drive information from one of the defective third physical cluster or the defective fourth physical cluster to a reliable fifth physical cluster.

21. The method of claim 20, further comprising:
recording an address of one of the reliable physical structures containing the original of the drive information in a defect management area (DMA).

* * * * *